Nov. 19, 1963     K. C. D. HICKMAN     3,111,461
PROCESS AND APPARATUS FOR SEPARATING A VAPORIZABLE MIXTURE
Filed April 27, 1960     6 Sheets-Sheet 1

INVENTOR.
KENNETH C. D. HICKMAN
By Gray, Mase and Dunson, Attorneys

Nov. 19, 1963 K. C. D. HICKMAN 3,111,461
PROCESS AND APPARATUS FOR SEPARATING A VAPORIZABLE MIXTURE
Filed April 27, 1960 6 Sheets-Sheet 2
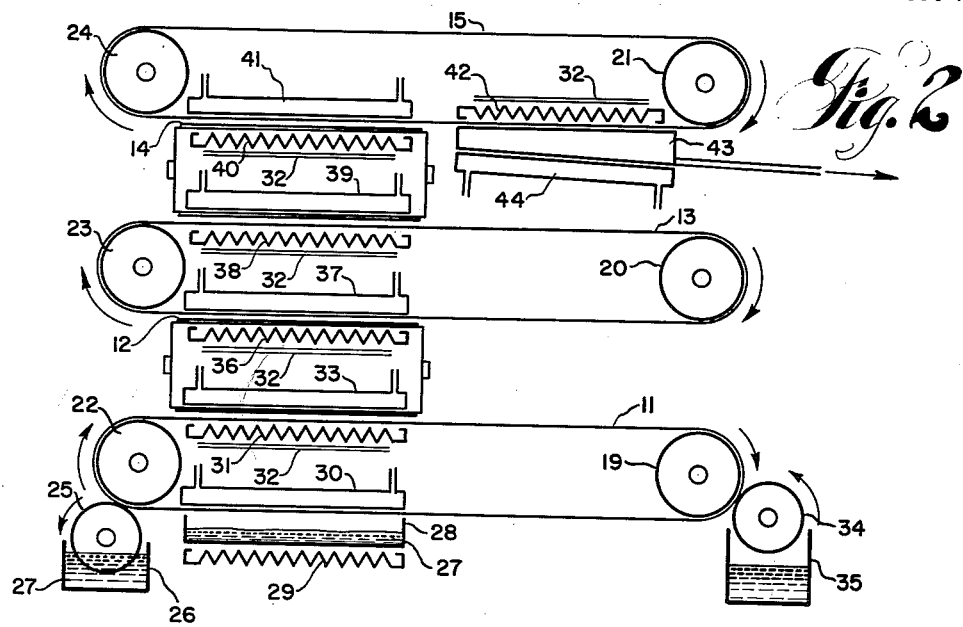
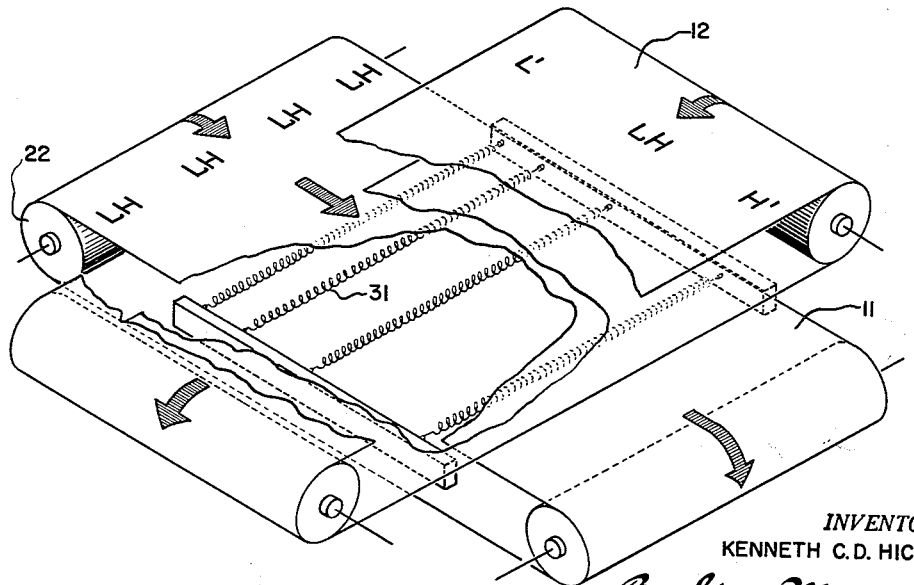
INVENTOR.
KENNETH C.D. HICKMAN
By Gray, Mase and
Dunson, Attorneys Nov. 19, 1963         K. C. D. HICKMAN         3,111,461
PROCESS AND APPARATUS FOR SEPARATING A VAPORIZABLE MIXTURE
Filed April 27, 1960                         6 Sheets-Sheet 3
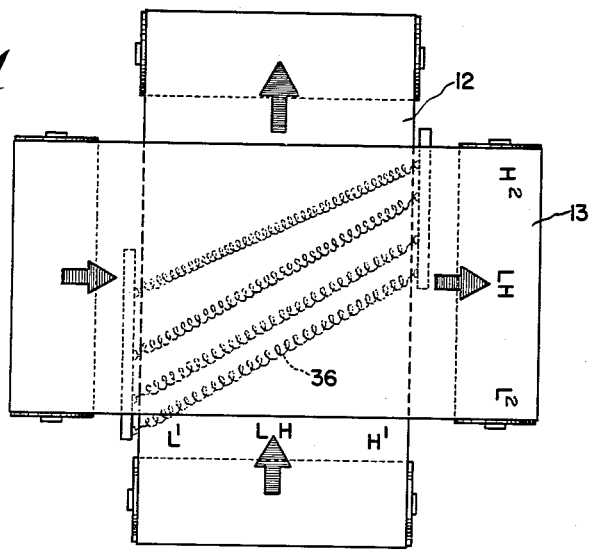
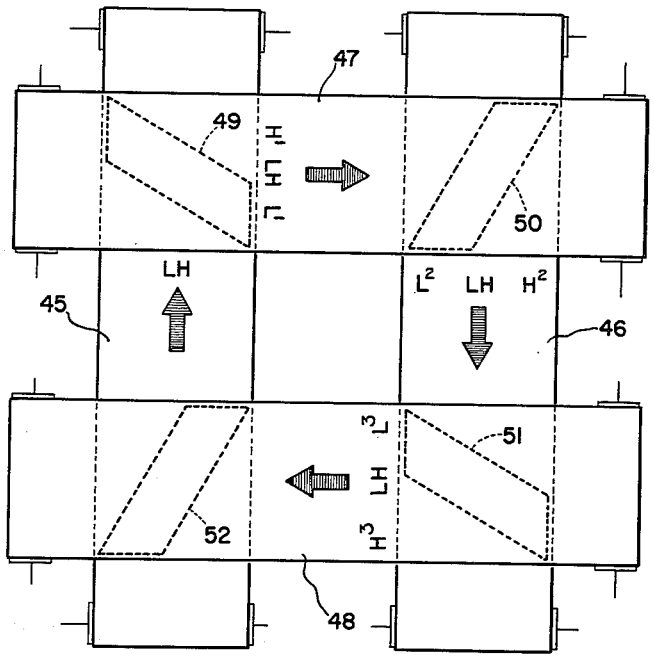
INVENTOR.
KENNETH C. D. HICKMAN
By Gray, Mase and
Dunson, Attorneys Nov. 19, 1963 K. C. D. HICKMAN 3,111,461
PROCESS AND APPARATUS FOR SEPARATING A VAPORIZABLE MIXTURE
Filed April 27, 1960 6 Sheets-Sheet 4

INVENTOR.
KENNETH C. D. HICKMAN
By Gray, Mase and
Dunson, Attorneys

Nov. 19, 1963  K. C. D. HICKMAN  3,111,461
PROCESS AND APPARATUS FOR SEPARATING A VAPORIZABLE MIXTURE
Filed April 27, 1960  6 Sheets—Sheet 5

INVENTOR.
KENNETH C. D. HICKMAN
By Gray Mase and
Dunson, Attorneys

Nov. 19, 1963 K. C. D. HICKMAN 3,111,461
PROCESS AND APPARATUS FOR SEPARATING A VAPORIZABLE MIXTURE
Filed April 27, 1960 6 Sheets-Sheet 6

INVENTOR...
KENNETH C.D. HICKMAN
BY

GRAY, MASE & DUNSON
ATTORNEYS

United States Patent Office 3,111,461
Patented Nov. 19, 1963

3,111,461
PROCESS AND APPARATUS FOR SEPARATING
A VAPORIZABLE MIXTURE
Kenneth C. D. Hickman, Rochester, N.Y., assignor to
The Battelle Development Corporation, Columbus,
Ohio, a corporation of Delaware
Filed Apr. 27, 1960, Ser. No. 24,928
20 Claims. (Cl. 202—52)

This invention relates to a process and apparatus for separating a vaporizable mixture. More particularly, it relates to a process and apparatus for the vaporization and collection of a vaporizable mixture in such a manner that each vaporization and collection results in an improved separation of the components of the mixture.

This application is a continuation-in-part of patent application Serial No. 242,941, now abandoned.

For purposes of disclosing and describing the invention herein, the words "component" and "constituent" will be used interchangeably and will be considered to be equivalent in meaning. The word "microfractor" has been coined and refers to the apparatus, in all its forms, disclosed and claimed herein. The term "cross path" as used herein refers to a spatial relationship wherein the paths of the carriers cross but are not coplanar.

Molecular stills or multiplate short-path stills have been built and operated with varying degrees of success. The principle of operation of such stills is that the molecules of vapor are presumed to travel from the evaporating surface to the collection surface in substantially a straight path, with few, if any, collisions. The existing methods of, and apparatus for, open-path distillation have been found not to be effective for the separation of the components of a mixture unless the components have widely different volatilities. When the volatilities of some of the components of the mixture are not widely different, numerous redistillations are necessary. In existing equipment and processes, such redistillations are complicated and the thermal hazard, that is the danger of decomposing heat-sensitive materials, is materially increased by the necessity for handling the materials between numbers of stills. Multiplate short-path or molecular stills for separating vaporizable mixtures containing components of close volatilities are generally constructed from many individual stills in countercurrent distillate-residue-flow relationship. Such stills are inherently unstable and when one or more of the many intermediate material streams falls out of adjustment, the others follow suit. The hold-up and consequent thermal damage in the transfer pumps is often many times greater than in the still and, as purification proceeds, viscous or solid constituents may be separated which neither flow from the condenser nor can be handled by the pumps.

The centrifugal still, which is one of the most useful forms of open path distillation apparatus, has been found ineffective for the handling of solid or viscous materials.

An object of the present invention is to provide a method and apparatus for effecting improved separation of materials under conditions of open-path distillation.

Another object of the invention is to provide simple and readily controlled apparatus for effecting a substantially continuous sharp separation of components of a vaporizable mixture, notwithstanding relatively small differences in their volatilities.

Still another object of the invention is to effect multiple distillation in an open-path still with a minimum of mechanical handling of material and attendant thermal hazard.

Another object of the present invention is to provide a means for short-path repetitive distillation in which the intermediate remixing of unlike increments is substantially avoided.

Still another object of the invention is to provide an apparatus for collecting increments of vapor in such a manner that increments of a specific composition are deposited on previously collected increments of substantially the same composition.

The above objects are met by the process and apparatus disclosed herein. The present invention pertains to a device, called a microfractor, for obtaining an improved separation of components of a vaporizable mixture and the process for separating vaporizable mixtures. The microfractor comprises at least two traveling carriers, adjacent sections of different carriers being crosswise and in short-path relationship to one another in the area of crossing, means for heating the section of the carrier with the vaporizable mixture where it is in short-path relationship to a section of another carrier, whereby the incremental portion of the mixture containing the most volatile constituent is vaporized in the earliest approach position of the carrier, means for collecting the vapors on a facing carrier, with change of state, in an array of deposits of varying compositions, means for moving the carriers relative to one another such that later increments of vapor deposit on earlier increments of a substantially like composition, and each additional transfer gives improved separation of the constituents of the original mixture, until a steady state is reached. The process for separating a vaporizable mixture comprises the steps of progressively heating the mixture to form a vapor; collecting successive increments of said vapor, with change of state, on progressive sections of a carrier, said vapor source and said carrier being moved relative to one another to form an array of deposits of varying composition on said carrier; inducing a change of state in the array of deposits on said carrier to liberate the deposits as vapors, beginning with the most volatile deposit; collecting said vapors with a change of state, on a second carrier moving crosswise and in short-path relationship to said first carrier, so as to form on said second carrier a second array of incremental deposits with improved separation of constituents, with like compositions being deposited on substantially like compositions; and repeating the vaporization of deposits beginning with the most volatile deposit, and vapor collection, as many times as desired, to improve the separation of constituents of the original mixture, collecting the vapor on carriers positioned during the collection, so as to deposit like compositions on substantially like compositions. By means of this process and apparatus, an improved separation of a vaporizable mixture whose constituents have close volatilities can be obtained without the attendant risk of thermal damage and loss of material because of material transfer. In the accompanying drawings, there are shown, more or less diagrammatically, specific embodiments of the invention.

In the drawings:

FIG. 2 depicts the arrangement of the five carriers and associated equipment, of the apparatus shown in FIG. 1;

FIG. 3 is a view of the first two moving carriers of the apparatus of FIG. 1 and showing the heater configuration to obtain progressive heating of the mixture;

FIG. 4 is a view of the heater configuration for transfer of the vaporizable mixture, beginning with the incremental portion of the mixture containing the most volatile constituent, from the second and succeeding carriers to the next adjacent carrier;

FIG. 5 is a view of the carrier and heater arrangement for one form of a four-carrier separation apparatus;

Figure 1:
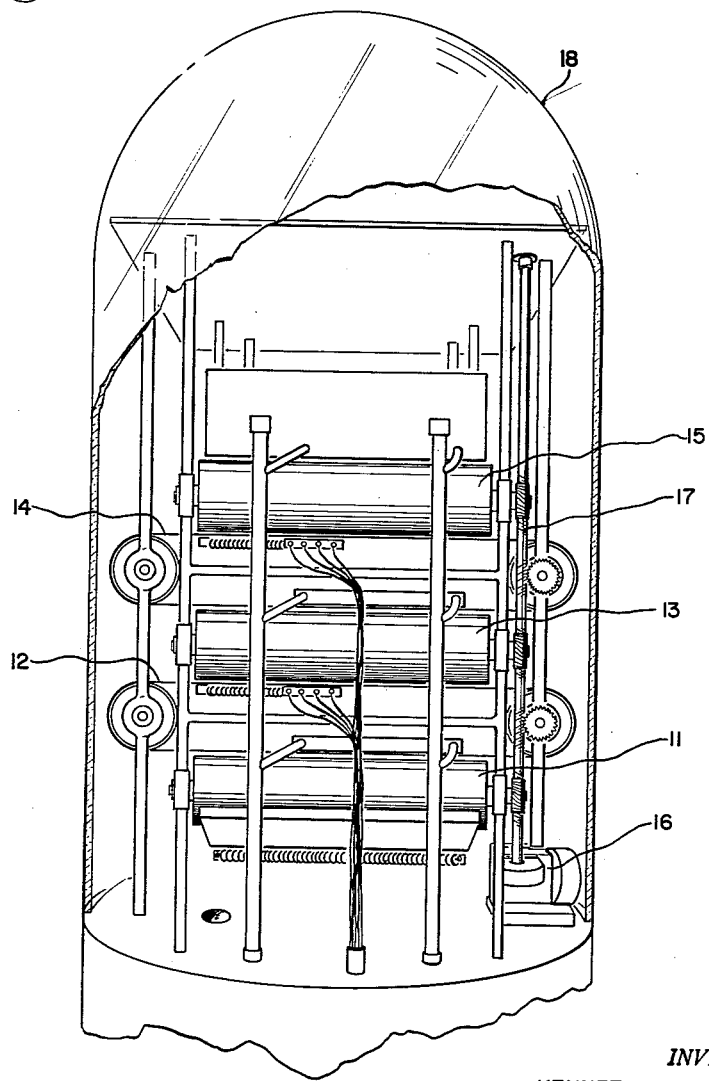
FIG. 1 is a schematic drawing of a five-carrier separation apparatus.

The apparatus employed to obtain an improved separation of vaporizable mixtures can best be described by reference to the drawings. FIG. 1 is a schematic drawing of one form of the apparatus. In this particular form there are five moving carriers, 11, 12, 13, 14, and 15, driven by the motor 16. The five carriers are connected to the motor by means of the common shaft 17. The carriers are enclosed by the cover 18 which serves to keep out dust and dirt and, where the separation requires a controlled residual gas pressure, an enclosure in which said pressure can be achieved.

FIG. 2 is a schematic dawing showing the arrangement of the five carriers and associated heating and cooling units. Means of sample application and removal are also illustrated. There is no particular significance to the number of carriers illustrated in FIGS. 1 and 2 and fewer carriers may be employed where less fractionation is required and many more carriers in series should be used where a high degree of fractionation is desired. In FIGS 1 and 2, the carriers 11, 12, 13, 14, and 15 are in the form of belts or bands and alternate carriers are in cross-path relationship to one another. The carriers are made of thermally conducting material and in this particular form of the apparatus are made of metal. Stainless steel has proven to be an excellent material of construction. The apparatus may be scaled to any size and thus particular dimensions are not critical. However, it is desirable to keep the thickness of the carriers to a minimum so that heat input and cooling problems will be minimized. Stainless steel sheets can readily be rolled to a thickness of 0.002 inch. The carriers travel between idler rollers, such as 19, 20, and 21, and the driven rollers 22, 23, and 24. The vaporizable mixture to be separated is applied to carrier 11. The mixture may be applied to the carrier in any convenient way. Two methods are illustrated in FIG. 2. An applicator roll 25, supported in trough 26, applies the vaporizable mixture 27, in the form of a liquid, to carrier 11. Carrier 11 is moving in a clockwise direction. Alternatively, the vaporizable mixture 27, in the form of a liquid or solid may be placed in trough 28 positioned beneath carrier 11 and heat applied to trough 28 by means of heater 29. The vaporizable mixture is thus collected on carrier 11 as a condensate with the assistance of condenser 30. By the clockwise movement of carrier 11, the vaporizable mixture is carried over heater 31 which is thermally insulated from condenser 30 by means of the trough 32. Residue remaining on carrier 11 after it has passed over heater 31 may be removed by a brush roller or scraper 34 and collected in trough 35 to be either discarded or reintroduced into the feeding trough, 26 or 28. The vapors rising from carrier 11 are collected on carrier 12, which has been cooled by means of condenser, or cooling platen, 33. Carrier 12 is similar to carrier 11 and is moving in a path substantially at right angles to the path of carriers 11 and 13. The movement of carrier 12 brings the condensate over heater 36 where it is again vaporized. The vapors are collected on carrier 13, which has been cooled by means of condenser 37. The movement of carrier 13 now brings the condensate over heater 38 where once again it is vaporized. The mixture, with improved separation of components, is collected on carrier 14, which has been cooled by means of condenser 39, and then is revaporized by means of heater 40, when carrier 14 has brought the condensate over said heater. With the collection of condensate on carrier 15, which has been cooled by means of condenser 41, the vaporizable mixture will now be spread on the carrier in bands representing the constituents of the mixture. When it is desired to utilize the apparatus on a continuous-process basis, means for removing the separated mixture from carrier 15 must be provided. Any suitable means of sample removal may be employed. In the apparatus shown in FIG. 2, the heater 42 vaporizes the separated mixture and it is collected in trough 43 which contains suitable partitions to keep the constituents of the mixture defined or separated. Provision may be made to replace trough 43, when it is full, with an empty trough. The collection trough is cooled by platen 44 to condense the vapors. The diagrammatic drawing of the arrangement of the carriers, associated heaters, and cooling means shown in FIG. 2 indicates that the distillation or vaporization occurs in an upward direction. In many instances, however, the distillation may be carried out more conveniently in a downward direction, in which case the configuration shown in FIG. 2 is merely inverted and the feed material begins at the top and is cascaded downward.

The improved separation of the constituents of a vaporizable mixture resulting from the use of the device described herein can be attributed to the particular geometric relationship of the heaters and their adjacent carriers. As illustrated in FIG. 2, each carrier has a heater associated therewith.

A vaporizable mixture to be separated will contain more and less volatile constituents or components. These may be designated light (L) and heavy (H), with intermediates designated as i, k, j, etc. The objective is to separate the constituents or, in any one operation, to separate the lightest constituent from the rest, which reduces the process to binary separation of the light from the heavy. The apparatus is primarily useful for separating vaporizable mixtures that have a relatively small separation coefficient, $\alpha$. For example, for most separations, utilizing this apparatus, the value of $\alpha$ will be in the range of from 1.1 to 1.5. Where a degree of separation, $\alpha$, for a single evaporation gives a first increment of light component, designated by $L^1$, then a second distillation of $L^1$ will give a new increment with designation $L^2$, a third $L^3$, while an infinite series of redistillations would yield pure L or $L^\infty$. The residue on the carriers, where the starting mixture was LH, will become $(LH-L^1)$ which we shall designate $H^1$, after the first vaporization, $H^2$ after the second, and finally pure H or $H^\infty$. At intermediate stages, the carriers will contain increments of mixture ranging in series from $L^n$ through LH to $H^n$, where $n$ represents the number of distillations.

FIG. 3 is a detailed view of carriers 11 and 12 and heater 31. In FIG. 3, the mixture LH on carrier 11 passes over heater 31. Carrier 12 is traveling in the direction indicated and is in short-path relationship to carrier 11. For the present, only the collecting surface of carrier 12, which is opposite heater 31 will be considered. As the mixture LH passes over the heater 31, the more volatile components will be the first to be vaporized. Thus, on carrier 12, component $L^1$ will be collected to the left of center, LH in the center, and component $H^1$ to the right of center.

As shown in FIG. 3, carrier 12 now has condensed on its surface components $L^1$, LH, and $H^1$. As carrier 12 moves, the collected vapors are brought over heater 36. The geometric arrangement of the elements of heater 36 in relation to the direction of travel of carrier 12 is the key to obtaining improved separation of the components of the vaporizable mixture and to the area programming of the vapor collection on each carrier. In a continuous operation, increments of substantially like composition will be deposited on top of one another in the same area on the surface of a particular carrier. Heater 36 and subsequent heaters 38 and 40 are so arranged that the area of the carrier containing the incremental portion of the mixture with the most volatile component will be the first to pass over the heating elements. Such an arrangement is shown in FIG. 4. To generalize, wherever adjacent, facing sections of two carriers are in cross-path relationship whereby the projection of the one facing carrier on the other forms an approximate parallelogram, to obtain an improved separation of the components of a vaporizable mixture it is necessary that the heater, or the heating means associated with the carrier containing the mixture to be vaporized, span the parallelogram diagonally so that the incremental portion with the most volatile component of the mixture is the first to be heated. While FIG. 4 shows the crossing carriers at substantially right angles to one another, the apparatus is operable as long as the carriers are in a cross-path relationship, regardless of the angle of crossing. It is desirable to design the apparatus such that the angle of heaters 36, 38, and 40 may be varied with respect to their associated carriers. For example, it is desirable to accentuate the arrival of the incremental portion with the more volatile component to the heater in situations where the separation coefficient is smaller. Thus, in FIG. 4 carrier 12 passes over its heater 36 in such a manner that component $L^1$ is the first to be vaporized. Consequently, carrier 13 in cross-path relationship to carrier 12 will receive components $L^2$, LH, and $H^2$ in an array across the surface of the carrier.

Subsequent heaters, such as 38 and 40, are arranged with respect to the carriers they heat in the same manner that heater 36 is arranged with respect to carrier 12.

The effect of this arrangement of the heaters and carriers in programming the separation of a vaporizable mixture is emphasized in the specialized form of the apparatus shown in FIG. 5. FIG. 5 is a diagrammatic view of two carriers side by side and a second pair of carriers, side by side, and situated above the first pair of carriers and moving in a direction crosswise to the first pair. By arranging the heaters in the manner shown, so that the incremental portion with the most volatile component is the first to be vaporized, the most volatile component can be made to always position itself on the innermost edge of each of the four carriers. The simple arrangement of carriers shown in FIG. 5 clearly demonstrates the principle of positioning a component of a vaporizable mixture on a particular section of a moving carrier.

For a continuous operation of the apparatus shown in FIG. 5, the vaporizable mixture may be applied in any convenient manner to the center of carrier 45 and removed in any convenient manner from carrier 48. Removal can be accomplished by a collection trough under heater 52.

Figure 6:
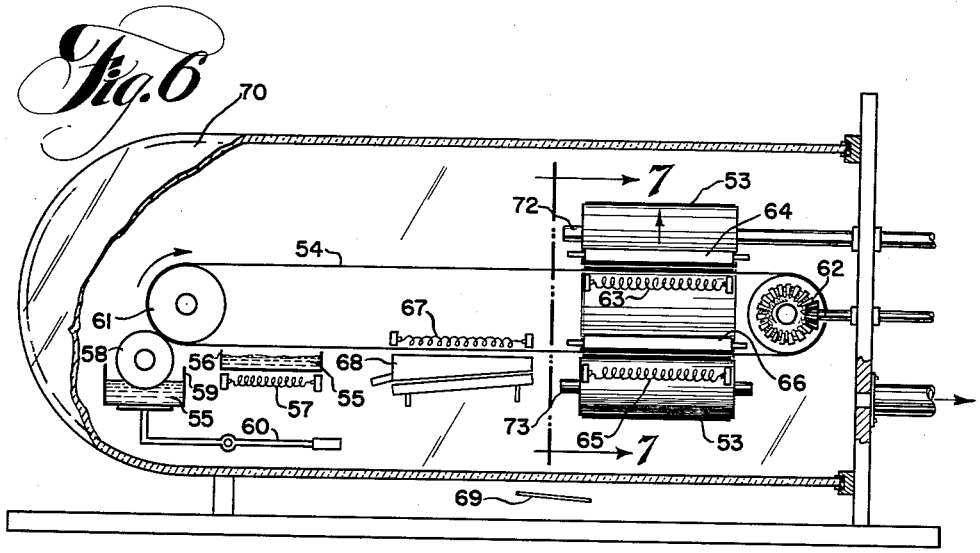
FIG. 6 is a view of a two-carrier apparatus featuring one carrier that follows a path in the shape of a horseshoe.
Figure 7:
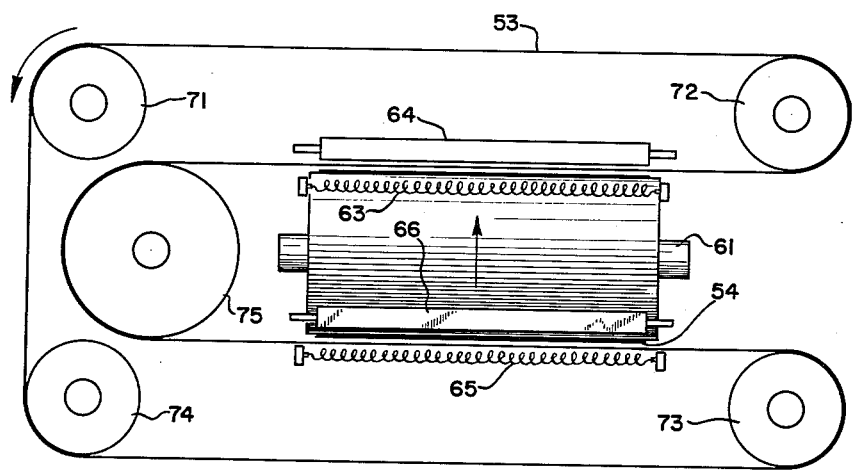
FIG. 7 is a detailed view of the configuration of the two carriers of the apparatus shown in FIG. 6.

The simplest form of the apparatus is one involving only two moving carriers and each carrier has a heater associated with it that is arranged diagonally with respect to the area of the carrier it is to heat. In a preferred embodiment of the apparatus comprising two traveling carriers, the first carrier travels substantially in a path shaped in a horseshoe in the direction normal to its surface and the second carrier passes within the horseshoe path of the first carrier and in short-path relationship to the first carrier at two points. This preferred embodiment is shown in FIG. 6 and FIG. 7. Carrier 53 follows the path substantially in the shape of a horseshoe and carrier 54 passes within the horseshoe. This particular form of the apparatus may be used for batch, semicontinuous and continuous separation processes.

Again referring to FIG. 6, a vaporizable mixture 55 is applied by any convenient method to carrier 54. Two alternative means of application are illustrated. The first is by vaporizing the mixture from trough 56 by means of heater 57. The second is by means of a roller 58 which picks up the mixture from trough 59. The roller 58 is brought into contact with the carrier 54 by means of the lever 60. Carrier 54 is looped between the idler roller 61 and the driven roller 62. Carrier 53 which travels substantially in a path shaped in a horseshoe passes in shortor close-path relationship to carrier 54 at two points, namely in the areas where heaters 63 and 65 are located. Heaters 63 and 65 are arranged in a diagonal relationship to the respective sections of carriers 54 and 53 passing over them, such that the area of the carrier with the more volatile component of the vaporizable mixture is the first to pass over the heater. The heater arrangement is similar to that of heater 36 in FIG. 4. Accordingly, in FIG. 6, when carrier 54 containing the vaporizable mixture passes over heater 63, the mixture is vaporized and the vapors are collected on carrier 53. The collection is assisted by the cooling platen 64 situated beneath carrier 53. As carrier 53 moves the collected vapors over heater 65, the array of deposits is again vaporized, beginning with the most volatile deposit. The vapors are collected on carrier 54 and carrier 54 is cooled in the area of collection by means of cooling platen 66. After a series of transfers between carriers 54 and 53, the most volatile component of the mixture will be at one edge of carrier 54. This most volatile component of the mixture may be removed from the edge by means of heater 67 or alternatively by means of a scraper. The removed sample may be collected in trough 68 which would include a cooling means if the sample were removed from the edge of carrier 54 by vaporization.

In a continuous operation of the apparatus shown in FIG. 6, it is important that the vaporizable mixture 55 be applied only to the center section of carrier 54 by the applying means, either roller 58 or the heater 57. During transfers between carriers, the more volatile components of the mixture are directed more and more toward one edge of the carrier and the less volatile components toward the opposite edge of the carriers.

FIG. 7 is another view of the carriers shown in FIG. 6. In this view it can be seen that carrier 53 travels over idler rollers 71, 72, 73, and 74 and the driven roller 75.

Again with reference to FIG. 6, the travel of the under portion of carrier 53 and the separation of the vaporizable mixture thereon can conveniently be observed by means of an aid such as mirror 69. The carriers can be enclosed in a container or cover 70 such that the system can be operated under a residual gas pressure of the order of magnitude of the vapor pressure generated by the constituents of the mixture during vaporization. It is convenient to make this cover of a transparent material, such as glass, so that the separation of the vaporizable mixture on carriers 53 and 54 can be observed visually.

In the operation of an apparatus employing only two carriers of the type shown in FIG. 6, it is essential that the means of heating be arranged diagonally to the section of the carrier containing the vaporizable mixture. In an apparatus employing more than two carriers, such as that shown in FIG. 1, it is essential that all heaters subsequent to the first heater be arranged diagonally with respect to the section of the carrier which it is to heat. If all heaters were arranged in such a manner that they were substantially normal to the path of the carrier, remixing of the components of the vaporizable mixture would occur on succeeding carriers and an improved separation would not result. By arranging the heaters with respect to the carriers in the manner described herein, it is possible to take advantage of the principle of least mixing in separating a vaporizable mixture.

Figure 8:
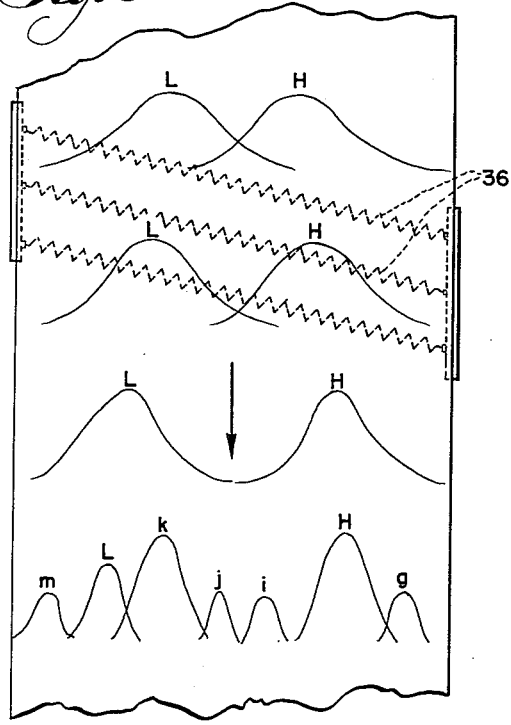
FIG. 8 shows elimination curves for three degrees of separation of L and H, the constituents of a two-component mixture.

In separating, in the apparatus described herein, a vaporizable mixture, which has two components L and H, mixture LH is applied to the center section of the first carrier and is then transferred from one moving carrier to another moving carrier a sufficient number of times to separate on the carrier the components of the mixture. The components of the mixture L and H will appear in separate parallel strips on the carrier and at opposite sides of the carrier. Any unchanged material, LH, will remain in the center section of the carriers. The number of transfers required between carriers to effect a suitable separation is determined by the separation coefficient all other variables being held constant. If the absolute quantities of each constituent L and H were determined by some other form of analysis, for example by absorption spectra, at each place on the carrier, the values may be plotted graphically in the form of elimination curves, see N. Embree, Industrial and Engineering Chemistry, vol. 29, 975 (1937). Such curves for three degrees of separation of L and H are shown in FIG. 8. If an additional substance, $j$, were in the mixture, with volatility midway between L and H, it would be separated on the carrier and take up a position between L and H on the carrier. Certainly some LH would also be present at this point, but the quantity could be made inconsequential by repeated distillations. In the same manner, other constituents in a vaporizable mixture, such as $m, k, i, g$, etc., would each be directed to a particular strip or area on each carrier, and on the final carrier might give a distribution of the kind shown in the bottom elimination curve of FIG. 8. To aid in the identification and location of particular components of a vaporizable mixture, tracer materials can be introduced into the mixture. Such tracers may consist of colored or radioactive substances that can readily be located on the carrier. Unknown components of a mixture can thus be identified by association with the tracer materials.

It should be pointed out that only the lightest or most volatile component is likely to be entirely pure after a finite number of transfers. To separate $n$ components of a mixture in pure form, it would be necessary to make $(n-1)$ separate operations, removing the most volatile constituent from the edge of the last carrier after each operation. When the most volatile component of the mixture has been removed from the last carrier, the temperature of the heaters is increased and the next most volatile component is moved to the edge of the last carrier. This procedure can be repeated any number of times until all of the desired components of the mixture have been separated and removed from the edge of the last carrier.

Figure 9:
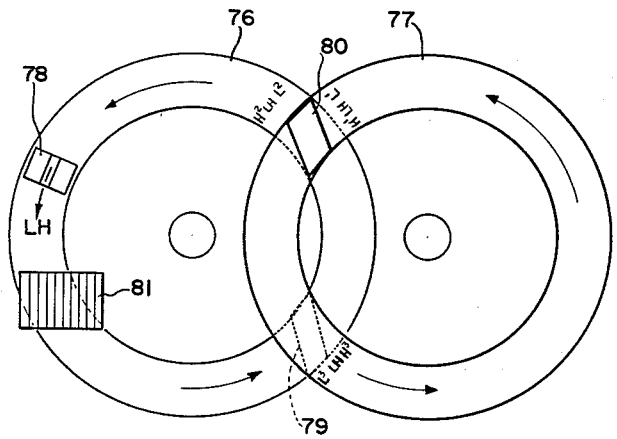
FIG. 9 is a view of an alternate form of a two-carrier apparatus, in which the carriers are in the shape of disks.

In constructing the apparatus, it is not necessary that adjacent carriers cross paths at right angles. However, when adjacent carriers cross paths at other than at a right angle, the equivalent relationship between the carrier and its heater must be observed so that the incremental portion of the mixture containing the most volatile constituent will be the first to be vaporized. Up to this point it has been convenient to describe and think of the carriers in terms of moving belts. However, the carriers may consist of any suitable equivalent. For example, the carriers may comprise two thin rotating disks which overlap so that the outer edge of one crosses the path of the outer edge of the other at two points. Such an arrangement is shown in FIG. 9. Referring to FIG. 9, carrier 76 is located in a plane below the plane of carrier 77. The carriers rotate in the direction indicated in FIG. 9. A sample applicator 78 applies the vaporizable mixture, LH, to the center of carrier 76. Carrier 76 then transports the mixture over heater 79 where it is transferred to carrier 77. The means for cooling carriers 76 and 77 are not shown. Carrier 77 then transports the collected vapors to heater 80 where the array of deposits is again vaporized and transferred back to carrier 76. The transfers between carriers 76 and 77 may be repeated as many times as desired, or until the more volatile component reaches the outer edge of one of the carriers. When the vaporizable mixture has been distributed across the carrier as desired, with the more volatile component at the outer edge and the less volatile component at the inner edge, the separated mixture may be removed from the carrier by any convenient method. In FIG. 9, the separated components are removed from carrier 76 into a compartmented collection trough 81. The sample may be transferred from the carrier to the collection trough by either heating or scraping.

In the area where carriers 76 and 77 overlap in space, said carriers are in short-path relationship to one another. Obviously, if it is desired, many such disks can be stacked vertically or side by side to form multiplate units comparable to that illustrated in FIG. 1. The apparatus comprising two carriers described in FIG. 9 is comparable to the two-carrier apparatus shown in FIG. 6.

Figure 10:
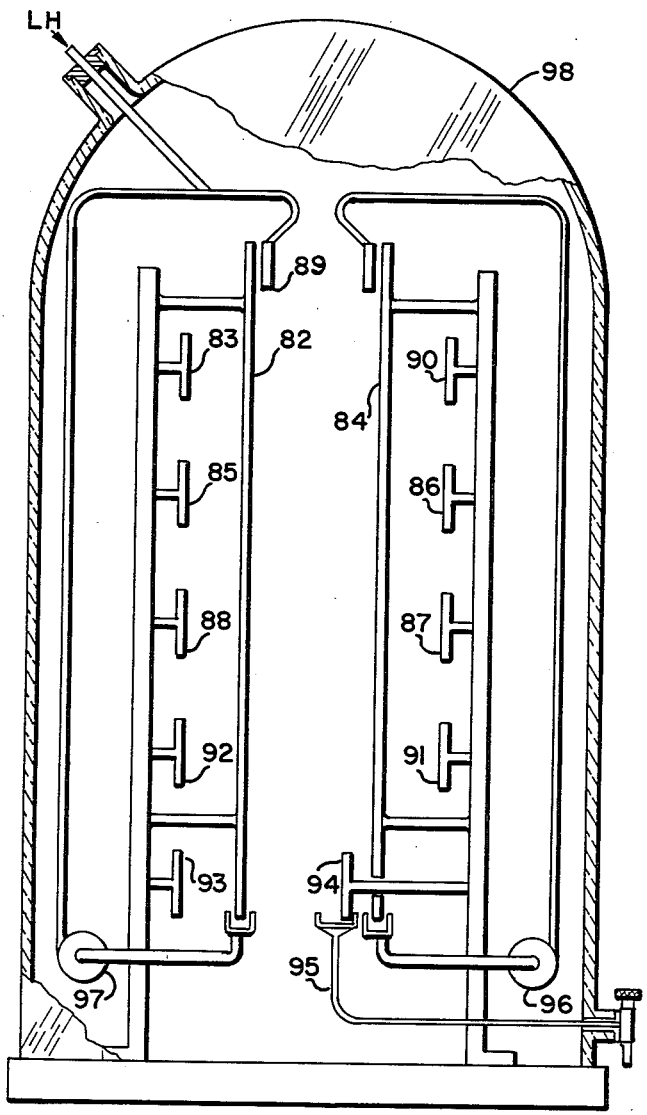
FIG. 10 is a view of another form of the apparatus in which the moving carriers are streams of liquid.
Figure 11:
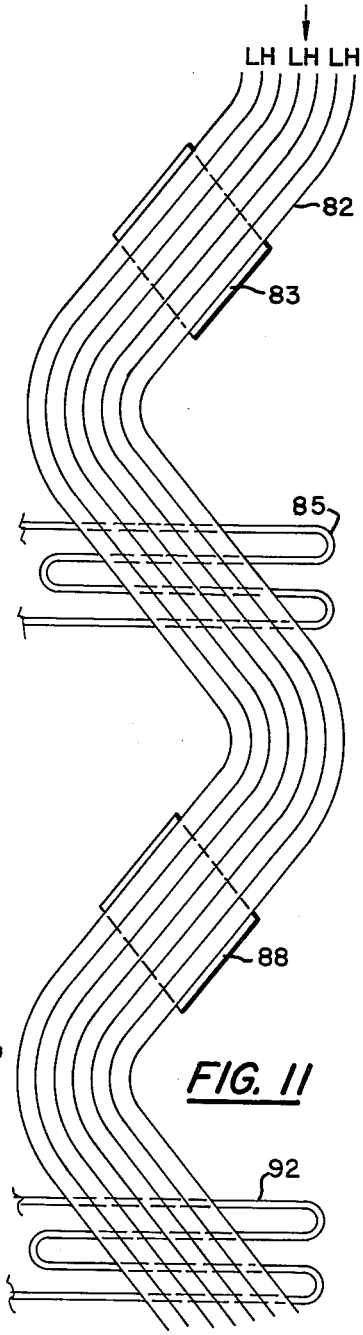
FIG. 11 is a front view of a rigid support member having sinuous channels on its face; this support member is part of the form of the apparatus shown in FIG. 10.

The carriers need not be in the form of belts, disks, or bands. Further, the carriers need not comprise a metal. Moving streams of liquid or oil that have a boiling point above that of the vaporizable mixture may also serve as carriers. To utilize a flowing liquid as a carrier, it is only necessary that a thin stream of liquid be ducted downward on each of two channeled surfaces opposed to one another and whose paths overlap in space at a plurality of points during the downward course of travel. Such an arrangement is diagrammatically illustrated in FIG. 10. FIG. 11 is a front view of a channeled surface. Referring to FIG. 10 and FIG. 11, a vaporizable mixture, LH is added to the oil stream flowing down surface 82. The mixture may be added to the oil in any convenient manner. A spraying means 89 is shown. When the oil stream passes over heater 83, the vaporizable mixture is volatilized and is transferred to the facing oil stream on surface 84 which has been cooled by cooling platen 90, and is in short-path relationship to stream 82. After it has passed heater 83, the oil stream 82 is cooled by means of cooling platen 85. When the oil stream 84 passes over heater 86, the collected vapors are again volatilized and are transferred back to carrier 82. The oil stream 84 is then cooled by means of cooling platen 87. When the oil stream passes over heater 88, the mixture is again vaporized, beginning with the most volatile constituent, and is transferred to carrier 84, with improved separation of components. The vaporizable mixture may thus be transferred from one carrier to the other as many times as desired in order to obtain the desired degree of separation. Additional heater 91, cooling platen 92, and heater 93 are shown. The number of transfers required will depend on the separation coefficient for the particular mixture. In this form of the apparatus, as in the other forms previously described, the most volatile constituent of the mixture collects at one edge of the carrier oil stream and the least volatile component at the opposite edge of the oil stream of a particular carrier. At the base of the oil stream, the separated mixture may be collected by any convenient method. One such method would be to have a separate collection vessel for each channel of the oil stream. Another method is to have a cooled channeled surface 94 having channels corresponding to surface 82 to condense and collect the separated components in individual channels. These then flow into a receiver 95 having a separate channel for each channel of collector 94. The oil, or other high-boiling fluid, used as the carrier on surfaces 82 and 84 is recirculated at the top of these surfaces by means of pumps 96 and 97. The cover 98, as in the case of cover 18 in FIG. 1, serves to keep out dust and dirt and permits control of the pressure of the system.

Generally stated, the novel concept of the apparatus described herein, which may have many forms, is that the apparatus provides a means for programming the vaporization of a vaporizable mixture and the collection of said vapors repetitively in any number of steps with respect both to time and position such that the more volatile constituents of the mixture always vaporize and are collected earlier than the less volatile constituent, with improved separation of the constituents on the carrier with each transfer.

When the vaporizable mixture is transferred from a section of one carrier to a section of another carrier, the sections of the carriers involved in the transfer and collection must be in short-path relationship. By short-path relationship is meant that the distance or gap between facing carriers is small relative to the width of the carriers, the gap being $1/20$ to $1/100$ of the width. Thus, with a carrier having a width in the range 6 to 12 inches wide, a gap of $1/4$ to $3/8$ inch would yield superior results. Of course, much narrower or wider gaps may be used to advantage under appropriate conditions. Metal carriers may be kept the appropriate distance apart by simple tensioning of the idler rollers and the driven rollers. Where the gap between the facing carriers must be especially small, the carriers may be made of magnetic materials, or magnetic materials may be attached to the back of the carriers, and then magnets may be used as an additional tensioning means. As the gap between the facing carriers is increased, smudging of the vaporized components of the mixture takes place in the gap between the carriers. This smudging effect is a limiting factor in determining how complete a separation can be obtained for a multicomponent mixture. This smudging effect of the vapors of the components of the mixture can be minimized by keeping the distance between the facing carriers to a minimum and by maintaining a suitable residual pressure of foreign gas in the still. This pressure is adjusted to compare with the maximum vapor pressure reached during the vaporization and collection of the mixture. Thus, if the vapor pressure reaches ten microns, corresponding approximately with six grams per second evaporated per square meter, smudging is minimized if the residual pressure is between three and twelve microns. While, in many instances, it is valuable to maintain a residual gas pressure of the correct order, on other occasions it may also be desirable to utilize the apparatus to separate vaporizable mixtures at residual gas pressures ranging from above atmospheric pressure to the pressure associated with a high vacuum.

In practising the process of this invention, vaporizable mixtures that are otherwise inseparable may be separated into their components. Since repetitive distillations may be carried out without thermal damage to the components of the mixture and without handling between the vaporization and collection steps, mixtures with extremely low separation coefficients can be separated. At the start of the process, the vaporizable mixture is placed on, or applied to, a traveling carrier. This may be done in any convenient manner. The mixture may be vaporized from a trough onto the carrier; it may be applied to the carrier by a roller which dips in a trough containing the mixture; it may be manually applied with a brush or any similar instrument, or where liquids are involved by means of a spray. Where metal belts are employed as the carriers, it is important that the mixture to be separated adhere to the belt. Solid solutions and viscous liquids are readily handled by this type of carrier. When the vaporizable mixture to be separated is a liquid, carriers comprising a high boiling liquid flowing down a channeled sheet are best suited for the separation process.

While the separation process is applicable to multicomponent mixtures, for the purposes of explaining the process at this point, a two-component system, wherein the components are L, the more volatile component, and H, the less volatile component, will be discussed. The mixture, LH, is applied to the first traveling carrier by one of the means discussed above. The separation process begins when the first carrier passes over a heater, with a section of a second moving carrier in position to collect the vapors. The heater is arranged so that the more volatile component of the mixture will be the first to be vaporized. Since the section of the carrier being heated is opposite a section of the second carrier which is moving cross path to the first carrier, the vapors of the more volatile component will strike and be collected on the leading edge of the second carrier. The remainder of the mixture will be spread across the carrier in order of volatility, with the least volatile component of the mixture, $H^n$, where $n$ represents the number of vaporizations, on the back edge of the second carrier. The receiving, or second carrier, is equipped with means for receiving and retaining the vapors that impinge upon it. In many cases, a cooling means cools this carrier sufficiently so that the vapors will condense on its surface and be retained there. However, the surface of the receiving carrier may also be coated with materials that serve as absorbers or adsorbers of the vapors. In the situation where the carrier is a flowing liquid the vapors are entrained by the liquid.

Since heat is being put into the system at each stage where the vapors are liberated, it is necessary to remove this heat to prevent the over-all temperature of the system from continually increasing and reaching unmanageable levels. Consequently, cooling means are provided to cool each carrier after the vapors have been liberated therefrom. In the situation where the receiving carrier acts as a condenser, the cooling takes place conveniently at the location where the carrier is to receive the vapors.

Thus, after the mixture has passed over the first heater where it is vaporized and transferred to a carrier traveling in cross-path relationship to the first carrier, the vaporizable mixture, LH, has been separated to the extent that component $L^1$ can now be found on one side and component $H^1$ can now be found on the opposite side of the unmodified mixture, LH, which would still be retained in the center of the receiving carrier. The collected vapors are now transported by the second carrier to a position where this carrier is in cross- and short-path relationship to a section of another carrier, which may be a new carrier or another section of the first carrier. At this point, the section of the second carrier containing the collected vapors is heated by a heating means arranged in such a manner that the more volatile component, $L^1$, is the first to be heated and vaporized. The vapors formed are collected on the opposing carrier, by means already described, with a further separation of the mixture taking place. The front or leading edge of the new carrier would receive component $L^2$, any unseparated component LH would be situated in the center of this carrier, and component $H^2$ would be located on the back or far edge of this carrier. Any $L^1$ would be situated between $L^2$ and unmodified LH and $H^1$ would be situated between LH and $H^2$. This transfer between carriers may be repeated any number of times until the components of the mixture are sufficiently separated on a carrier.

The separated components of the mixture may be removed from any carrier on which they are situated in a separated state. One method of removing the separated components is by stopping the traveling carriers, in the case where they are mechanically powered, and physically scraping each component from the carrier. Still another method would be to remove them from the carrier by means of appropriate solvents. In a continuous operation the separated components could be removed from the carrier by vaporizing them into a divided receiver, each component of the mixture being printed down into a separate section of the receiver. The fact that the carrier might be a flowing liquid creates no problem in removing the sample, since the separated mixture could be collected at the bottom of the descent of the liquid by vaporizing the components from the liquid into a divided receiver. As an alternative procedure each channel of the falling liquid could be passed through a separation treatment and the separated components removed before it is recycled to the beginning of the channel guide.

Because of the cross-path arrangement of adjacent carriers and the fact that the heaters are arranged so that the incremental portion containing the most volatile constituent is always the first to be heated, like compositions are deposited on substantially like compositions on the receiving carrier. Thus, a continuous process is possible with a minimum of remixing on the part of the constituents of the mixture as repetitive vaporizations and collections are carried out. The process can be looked upon as a programing of vapor collection in the separation of the components of a vaporizable mixture.

What is claimed is:

1. An apparatus for obtaining an improved separation of components of a vaporizable mixture comprising:
   (a) at least two traveling carriers, said carriers having section adjacent to one another and said adjacent sections being nonparallel and in short-path relationship to one another;
   (b) means for supporting and moving said carriers;
   (c) means for collecting vapors on a moving carrier;
   (d) means for supporting said collecting means;
   (e) means for heating the carrier with the collected vaporizable mixture, beginning with that area of the carrier that first previously received vapors, when it is adjacent and in short-path relationship to a section of another carrier;
   (f) means for supporting said heating means;
   (g) means for collecting vapors on a moving, substantially nonparallel facing carrier, with change of state, in an array of deposits of varying compositions;
   (h) means for moving the carrier with the collected vapors over a heating means arranged to first heat that area of the carrier that first previously received vapors;
   (i) and means for relatively moving another carrier to collect the vapors from the previous carrier, with improved separation of components.

2. In the apparatus of claim 1, means for maintaining a residual gas pressure of the order of magnitude of the vapor pressure generated by the constituents of the mixture during vaporization comprising an air-tight enclosure with ports for connection to vacuum means.

3. An apparatus according to claim 1 wherein said traveling carriers are belts.

4. An apparatus according to claim 1 wherein said traveling carriers are disks.

5. An apparatus according to claim 1 wherein said traveling carriers are high boiling liquids flowing in rigid, multi-channeled support means.

6. An apparatus according to claim 1 wherein said adjacent sections of traveling carriers are arranged crosswise substantially at right angles, with respect to each other.

7. An apparatus for obtaining improved separation of components of a vaporizable mixture comprising:
   (a) a plurality of traveling carriers, said carriers having sections adjacent to one another and said adjacent sections being nonparallel and in short-path relationship to one another;
   (b) means for supporting and moving carriers;
   (c) means for heating a carrier where it is in short-path relationship to another carrier;
   (d) means for supporting said heating means;
   (e) means for cooling that section of a carrier that is in short-path relationship to a section of another facing carrier that has an associated heating means;
   (f) means for moving a carrier with condensed vapors over a heating means arranged to first heat that area of the carrier that first previously received vapors; and
   (g) means for relatively moving another carrier to condense the vapors from the previous carrier, with improved separation of components.

8. An apparatus for obtaining improved separation of components of a vaporizable mixture comprising:
   (a) a plurality of traveling belts, said belts having sections adjacent to one another and said adjacent sections being nonparallel and in short-path relationship to one another;
   (b) means for supporting and moving said belts;
   (c) means for heating that section of a belt that is adjacent to and in short-path relationship to another belt;
   (d) means for supporting said heating means;
   (e) means for cooling that section of any belt that is adjacent to and in short-path relationship to a section of another belt that has associated with it a heating means;
   (f) means for supporting said cooling means; and
   (g) means for relatively moving belts so as to first heat that area of the belt containing the most volatile component of the vaporizable mixture and collection with improved separation of components on an adjacent belt in short-path relationship.

9. In the apparatus of claim 8, means for maintaining a residual gas pressure of the order of magnitude of the vapor pressure of the constituents of the vaporizable mixture during the act of vaporization comprising an air tight enclosure with ports for connection to vacuum means.

10. An apparatus for obtaining an improved separation of components of a vaporizable mixture comprising:
    (a) an air-tight enclosure with ports for connection to vacuum means;
    (b) within said enclosure, two endless traveling belts of predetermined width, the first belt traveling substantially in a path shaped in a horseshoe and the second belt traveling crosswise to and within the horseshoe path of the first belt;
    (c) said belts being in short-path relationship where said belts are adjacent;
    (d) means for supporting and driving said belts;
    (e) means for heating a belt carrying a vaporizable mixture where it is in short-path relationship to the other belt, heat being applied first to one edge of said belt;
    (f) means for supporting said heating means;
    (g) means for cooling a belt where it is in short-path relationship to the other belt and said other belt has an associated heating means; and
    (h) means for supporting said cooling means.

11. An apparatus for obtaining an improved separation of components of a vaporizable mixture comprising:
    (a) an air-tight enclosure with ports for connection to vacuum means;
    (b) within said enclosure, two, facing, vertically mounted rigid support members, said support members comprising a plurality of sinuous channels, sections of said channels being in cross- and short-path relationship to one another;
    (c) means for maintaining a downward flowing high boiling liquid in said channels;
    (d) means for adding a vaporizable mixture to said liquid on one support member;
    (e) means for heating the liquid on a support member beginning at one edge, where said liquid is in cross- and short-path relationship to the second support member;

(f) means for supporting said heating means;

(g) means for cooling the liquid on the other support member prior to its receiving vapors;

(h) means for collecting the separated mixture from a channeled support member; and (j) means for returning the high boiling liquid to the top of the channeled support.

12. A process for separating a vaporizable mixture into its components comprising the steps of:

(a) progressively heating the mixture to form a vapor;

(b) collecting successive increments of each component of said vapor, with change of state, on progressive sections of a carrier, said carrier being moved relative to said mixture in a direction other than substantially parallel to form an array of deposits of varying compositions and volatility on said carrier;

(c) progressively heating said deposits, with heat being applied first to the deposits on the area of the carrier on which is collected the most volatile component;

(d) collecting said vapors, beginning with vapors containing the most volatile component, with a change of state, on a second carrier moving in a direction other than substantially parallel and in short-path relationship to said first carrier, so as to form on said second carrier a second array of incremental deposits with improved separation of components; and (e) repeating the vaporization of said deposits beginning with the most volatile deposit, and vapor collection beginning with the most volatile component, as many times as desired, to improve the separation of components of the original mixture, collecting the vapor on carriers positioned other than substantially parallel to a preceding carrier during the collecting period.

13. The processs of claim 12 wherein the liberation and collection of the vaporizable mixture is carried out at a residual gas pressure approximately equal to the vapor pressure of the components of the vaporizable mixture during the act of vaporization.

14. The process of claim 12 wherein the liberated vapors travel in a short, substantially direct path to a collecting carrier.

15. In the process of claim 12, the additional and preliminary step of applying the vaporizable mixture in a thin layer on a carrier.

16. A process for separating a vaporizable mixture into its components comprising the steps of:

(a) applying the vaporizable mixture in a thin layer on a carrier;

(b) progressively heating the mixture to form a vapor;

(c) beginning with the first vapors formed, condensing successive increments of each component of said vapor on progressive sections of a second carrier, said second carrier being in short-path relationship and moving relative to said vaporizable mixture in a direction other than substantially parallel to form an array of deposits of varying composition and volatility on said second carrier;

(d) progressively heating said second carrier vaporizing the array of deposits, with heat being applied first to that portion of said second carrier on which is deposited the most volatile component;

(e) beginning with the first vapors formed, condensing said vapors, on a third carrier in short-path relationship and moving in a direction other than substantially parallel to the second carrier so as to form on said third carrier a second array of incremental deposits with improved separation of components;

(f) repeating the vaporization of said deposits beginning with the most volatile deposit, and vapor collection beginning with the first vapors formed, as many times as desired, to improve the separation of components of the original mixture, condensing the vapor on carriers positioned other than substantially parallel to a preceding carrier during the collection period; and (g) during steps (b) through (f) immediately above, maintaining a residual gas pressure of the order of magnitude of the vapor pressure generated by the components of the vaporizable mixture during vaporization.

17. The process of claim 18 wherein the liberated vapors travel in a short, substantially direct path to a collecting carrier.

18. A process for separating a vaporizable mixture into its components comprising the steps of:

(a) heating the mixture progressively to form a vapor;

(b) beginning with first vapors formed, absorbing successive increments of each component of said vapor on progressive sections of a carrier, said carrier being moved relative to said mixture in a direction other than substantially parallel to form an array of deposits of varying compositions on said carrier;

(c) progressively vaporizing the array of deposits on said carrier, beginning with deposits on that area of said carrier containing the most volatile deposit;

(d) absorbing said vapors on a second carrier moving in a direction other than substantially parallel and in short-path relationship to said first carrier, so as to form on said second carrier a second array of incremental deposits with improved separation of components; and (e) repeating the vaporization of said deposits, beginning with the deposit containing the most volatile component, and vapor absorption, as many times as desired, to improve the separation of components of the original mixture, absorbing the vapor on carriers positioned other than substantially parallel to a preceding carrier during the collection period.

19. A process for separating a vaporizable mixture into its components comprising the steps of:

(a) heating the mixture progressively to form a vapor;

(b) beginning with the first vapors formed, adsorbing successive increments of each component of said vapor on progressive sections of a carrier, said carrier being moved relative to said mixture in a direction other than substantially parallel to form an array of deposits of varying composition on said carrier;

(c) progressively vaporizing the array of deposits on said carrier, beginning with deposits on that area of said carrier containing the most volatile deposit;

(d) adsorbing said vapors on a second carrier moving in a direction other than substantially parallel and in short-path relationship to said first carrier, so as to form on said second carrier a second array of incremental deposits with improved separation of components; and (e) repeating the vaporization of said deposits, beginning with the deposit containing the most volatile component, and vapor adsorption, as many times as desired, to improve the separation of components of the original mixture, adsorbing the vapor on carriers positioned other than substantially parallel to a preceding carrier during the collection period.

20. A process of short path, vacuum distillation for separating a vaporizable mixture into its components comprising the steps of:

(a) distributing the vaporizable mixture in a thin layer on a surface;

(b) progressively heating said mixture to successively evaporate increments of each component of said mixture;

(c) condensing the vapors as a film upon a second surface and abstracting heat from said second surface, disposed adjacent the first surface such that the vapors travel in a substantially direct path between the surfaces;

(d) moving the surfaces relatively to each other during such heating and condensing so that the different components are condensed on a distinct portion of the second surface;

(e) maintaining the condensed layer on the second surface in the same spatial relation as deposited;

(f) disposing the second surface with condensed layer intact, adjacent a third surface;

(g) progressively heating the second surface vaporizing the condensed layer, with heat being applied first to that area of said second surface on which is deposited the most volatile component;

(h) condensing the vapors on the third surface after substantially direct travel from the second surface;

(i) moving the second and third surfaces relatively during the heating and condensation so that the different components are condensed on a distinct portion of the third surface; and (j) maintaining the condensate on the third surface in the same spatial relation as deposited.

References Cited in the file of this patent

UNITED STATES PATENTS 2,073,327     Vigers _____ Mar. 9, 1937

FOREIGN PATENTS 545,937     Great Britain _____ June 9, 1942